United States Patent [19]

Gwyn

[11] Patent Number: 5,234,477
[45] Date of Patent: Aug. 10, 1993

[54] METHOD OF REDUCING $NO_x$ EMISSIONS IN GASOLINE VEHICLES

[75] Inventor: John E. Gwyn, Katy, Tex.

[73] Assignee: Shell Oil Company, Houston, Tex.

[21] Appl. No.: 875,183

[22] Filed: Apr. 28, 1992

[51] Int. Cl.⁵ .............................. C10L 1/22
[52] U.S. Cl. ...................... 44/387; 44/399; 44/408; 44/422; 44/458; 423/235
[58] Field of Search .......... 44/408, 387, 399, 422, 44/458; 423/235

[56] References Cited

U.S. PATENT DOCUMENTS

| | | | |
|---|---|---|---|
| 1,277,605 | 9/1918 | Knottenbelt | 208/274 |
| 2,302,281 | 11/1942 | Watkins | 252/50 |
| 3,387,954 | 6/1968 | Capowski et al. | 44/422 |
| 3,468,640 | 9/1969 | Barusch | 44/422 |
| 3,900,554 | 8/1975 | Lyon | 423/235 |
| 4,107,272 | 8/1978 | Mori et al. | 423/239 |
| 4,166,724 | 9/1979 | Kanao | 44/458 |
| 4,220,632 | 9/1980 | Pence et al. | 423/239 |
| 4,423,017 | 12/1983 | Dean | 423/235 |
| 4,434,147 | 2/1984 | Dinpfl et al. | 423/235 |
| 4,438,082 | 3/1984 | Dettling et al. | 423/235 |
| 4,469,662 | 9/1984 | Hamada et al. | 423/235 |
| 4,787,916 | 11/1988 | Feldman | 44/422 |
| 4,978,514 | 12/1990 | Hofmann et al. | 423/235 |
| 5,098,680 | 3/1992 | Fellows et al. | 423/235 |

FOREIGN PATENT DOCUMENTS

| | | |
|---|---|---|
| 381236 | 8/1990 | European Pat. Off. |
| 3615705 | 11/1987 | Fed. Rep. of Germany |
| 2214524 | 8/1990 | Japan |
| 336515 | 11/1930 | United Kingdom |

Primary Examiner—Ellen M. McAvoy
Attorney, Agent, or Firm—Timothy J. Hadlock

[57] ABSTRACT

The present invention is an unleaded fuel composition containing a major amount of a hydrocarbon base fuel of the gasoline boiling range containing an amount effective to reduce $NO_x$ emissions from electronic port fuel injected engines of ammonia or an ammonium compound. The invention also includes a method of reducing $NO_x$ emissions from electronic port fuel injected engines by feeding to the engine exhaust gases at a point between the outlet valves and catalytic converter an amount effective to reduce $NO_x$ emissions from the engines of ammonia or an ammonium compound.

7 Claims, No Drawings

METHOD OF REDUCING $NO_x$ EMISSIONS IN GASOLINE VEHICLES

FIELD OF THE INVENTION

This invention relates to a gasoline composition for and method of reducing nitrogen oxides ($NO_x$) emissions from gasoline powered vehicles.

BACKGROUND OF THE INVENTION

Environmental concerns indicate the emission of nitrogen oxides to the atmosphere should be reduced. Nitrogen oxides are produced in gasoline automobiles during the gasoline combustion process. It would be advantageous to have a gasoline composition which produced little or no nitrogen oxides when combusted.

SUMMARY OF THE INVENTION

By adding ammonia or an ammonium compound to certain portions of a gasoline combustion system the nitrogen oxide emissions from gasoline powered vehicles is reduced or eliminated. This result occurs due the reaction of nitrogen oxides, produced during gasoline combustion, with ammonia to form nitrogen and water. Accordingly, the present invention is a method of reducing $NO_x$ emissions from a gasoline combustion system wherein said system comprises a combustion chamber, exhaust manifold, catalytic converter, and exhaust pipe between the exhaust manifold and the catalytic converter. The method is feeding at a point upstream of the catalytic converter an amount of ammonia or an ammonium compound effective to reduce $NO_x$ emissions from the gasoline combustion system. A composition to be used in one embodiment of this method is an unleaded fuel composition containing a major amount of a hydrocarbon base fuel of the gasoline boiling range containing an effective amount to reduce $NO_x$ emissions from electronic port fuel injected engines of ammonia or an ammonium compound.

DETAILED DESCRIPTION OF THE INVENTION

One aspect of the present invention is a method of reducing $NO_x$ emissions from a gasoline combustion system wherein said system comprises a combustion chamber, exhaust manifold, catalytic converter, and exhaust pipe between the exhaust manifold and the catalytic converter. The method is feeding at a point upstream of the catalytic converter an effective amount of ammonia or an ammonium compound to reduce $NO_x$ emissions from the gasoline combustion system. The ammonia will be liberated and will react with the NO and $NO_2$ according to equations I and II, respectively:

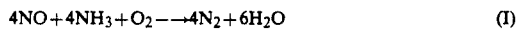

$$4NO + 4NH_3 + O_2 \longrightarrow 4N_2 + 6H_2O \quad (I)$$

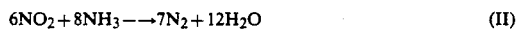

$$6NO_2 + 8NH_3 \longrightarrow 7N_2 + 12H_2O \quad (II)$$

Another aspect of the invention is a composition to use in one embodiment of the method, for example when the ammonium compound is fed to the combustion chamber. The composition is an unleaded fuel composition containing a major amount of a hydrocarbon base fuel of the gasoline boiling range containing an amount effective to reduce $NO_x$ emissions from electronic port fuel injected engines of ammonia or an ammonium compound. A representative concentration of ammonium compound expressed as ammonia is from about 750 ppmw to about 4500 ppmw, preferably from about 1500 ppmw to about 3000 ppmw, based on the gasoline weight.

An ammonia source may be used to jointly refer to either ammonia or ammonium compounds which liberate ammonia when heated. The ammonium compound is chosen from any ammonium compound which is soluble in gasoline and which decomposes under gasoline engine combustion chamber conditions for reaction with nitrogen oxides. These compounds include ammonium salts for example ammonium salts of organic or inorganic acids. These compounds include, for example, ammonium formate, ammonium hydroxide, ammonium propionate, ammonium dicitrate, ammonium chloride, ammonium chlorate, ammonium perchlorate, ammonium carbamate, ammonium carbonate, ammonium acetate. Preferred compounds are ammonium propionate and dicitrate. A representative concentration of ammonium compound expressed as ammonia is from about 750 ppmw to about 4500 ppmw, preferably from about 1500 ppm to about 3000 ppm, based on the gasoline weight.

The ammonia source is added anywhere upstream of the catalytic converter. For example, it is added to the combustion chamber by metering the ammonia source through a restriction orifice or by addition to the gasoline. In an alternative embodiment the ammonia source is added at the exhaust manifold or somewhere between the exhaust valves and catalytic converter.

The ammonium compounds are added to the gasoline at any point after the refining process, but preferably at the same time other additives, e.g., oxidation stabilizers or deposit reducers, are added. Such additives are typically added at the distribution terminal, i.e., the storage facilities from which the gasoline is distributed by truck to individual service stations. Since perchlorates are oxidizers caution should be taken in handling them.

The invention also includes a method of reducing $NO_x$ emissions from electronic port fuel injected engines by feeding to the engine exhaust gases at a point between the outlet valves and catalytic converter an amount effective to reduce $NO_x$ emissions from the engines. A representative concentration of ammonium compound expressed as ammonia is from about 50 ppmw to about 300 ppmw, preferably from about 100 ppmw to about 200 ppmw, based on the weight of the gasoline lair mixture combusted. The ammonium compound should be chosen such that it will decompose in the exhaust gas at or before reaching the catalytic converter. The catalyst promotes the desired reaction of nitrogen oxides and ammonia to nitrogen and water. The temperatures in the exhaust are slightly less than those in the combustion chamber and decrease as they proceed toward the catalytic converter. Thus compounds which decompose at lower temperatures are necessary if introduced closer to the catalytic converter. The compounds for use with this method include the same compounds listed above as additives to the gasoline. Preferred compounds for injection to the exhaust gases are ammonia and ammonium hydroxide.

The ammonia source is kept in a canister in liquified form and is injected through a restriction orifice. Such restriction orifices for injecting parts per million levels of liquids are known in the art. An electronically linked valve, for example, is used to open the restriction orifice when the vehicle is started. When solid ammonium compounds are used, for example, ammonium carbonate and carbamate, they are dissolved in a solvent for storage in the canister. A canister should be a size sufficient to necessitate replacement with a fresh canister only about every six months. The canister should be placed in the engine compartment or underbody according to the boiling point of the ammonium compound solution, pressure capacity of the container/canister, and the temperature levels of the engine compartment and underbody during operation of the vehicle. For example, liquified ammonia should be kept at less than about 140° F.

ILLUSTRATIVE EMBODIMENTS

In one illustrative embodiment, between 750 ppmw and 4500 ppmw, based on the gasoline weight, of an ammonium compound expressed as ammonia will be admixed with gasoline. The gasoline will then be combusted in a fuel-injected gasoline engine and the nitrogen oxides emissions will be measured. The same gasoline, absent the ammonium compound, will then be combusted in the same engine and the nitrogen oxides emissions will be measured. In a test under the same operating time and conditions, the engine combusting the gasoline containing the ammonium compound will have lower nitrogen oxides emissions.

What is claimed is:

1. An unleaded fuel composition comprising a major amount of a hydrocarbon base fuel of the gasoline boiling range containing an amount effective to reduce $NO_x$ emissions from electronic port fuel injected engines of an ammonium compound selected from the group consisting of ammonium formate, ammonium propionate, ammonium dicitrate, ammonium carbamate, ammonium carbonate, ammonium accetate, and admixtures thereof.

2. The composition of claim 1 wherein the ammonium compound is ammonium formate.

3. The composition of claim 1 wherein the ammonium compound is ammonium propionate.

4. The composition of claim 1 wherein the ammonium compound is ammonium dicitrate.

5. The composiition of claim 1 wherein the ammonium compound is ammonium carbamate.

6. The compositiion of claim 1 wherein the ammonium compound is ammonium carbonate.

7. The composition of claim 1 wherein the ammonium compound is ammonium acetate.

* * * * *